Figure 1:
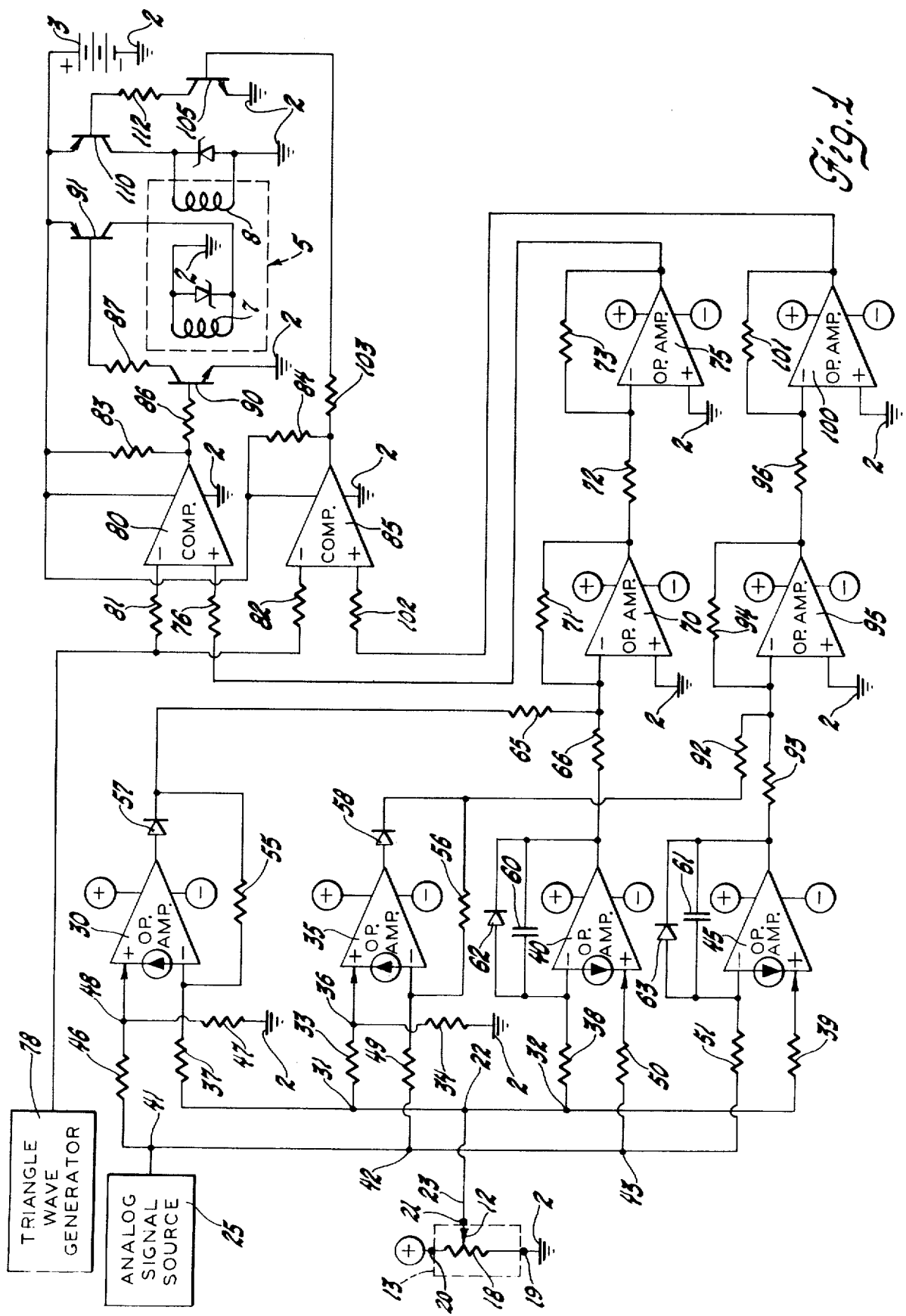

United States Patent [19]

Graham

[11] 4,288,730

[45] Sep. 8, 1981

[54] PROPORTIONAL AND INTEGRAL SOLENOID ARMATURE POSITIONING CONTROL SYSTEM

[75] Inventor: Donald E. Graham, Centerville, Ohio

[73] Assignee: General Motors Corporation, Detroit, Mich.

[21] Appl. No.: 945,086

[22] Filed: Sep. 25, 1978

[51] Int. Cl.³ .............................................. G05B 11/28
[52] U.S. Cl. ..................................... 318/599; 318/609
[58] Field of Search ............... 318/599, 609, 610, 621, 318/622

[56] References Cited

U.S. PATENT DOCUMENTS

| 2,946,943 | 7/1960 | Nye et al. | 318/610 |
|---|---|---|---|
| 3,805,099 | 4/1974 | Kelly | 310/12 |
| 3,870,931 | 3/1975 | Myers | 318/599 |
| 3,979,654 | 9/1976 | Guicheteau et al. | 318/599 |

*Primary Examiner*—J. V. Truhe
*Assistant Examiner*—Eugene S. Indyk
*Attorney, Agent, or Firm*—Richard G. Stahr

[57] ABSTRACT

A system for effecting the adjustment of the armature of a solenoid into a desired position as indicated by an input analog signal representation of desired armature position. When the actual position of the solenoid armature does not correspond to the desired position in a first or in a second relationship, respective mutually exclusive first and second proportional and respective corresponding mutually exclusive first and second integral error signals are produced. The corresponding proportional and integral error signals are summed and circuitry responsive to the sum of these signals effects the adjustment of the solenoid armature into the desired armature position.

3 Claims, 4 Drawing Figures

PROPORTIONAL AND INTEGRAL SOLENOID ARMATURE POSITIONING CONTROL SYSTEM

This invention is directed to a system for positioning the armature of a solenoid and, more specifically, to a system of this type that is responsive to an input electrical signal representation of desired solenoid armature position for effecting the adjustment of the armature into the desired position.

There are many applications in which it is desired to remotely control the actuation of a mechanical device in response to changing conditions. For example, it may be desirable to adjust the choke flapper valve or the air/fuel ratio control device of the carburetor of an internal combustion engine in response to changes of engine operating parameters or ambient conditions in which the engine is operating. Many of the sensor devices in general use in the internal combustion engine art produce analog output signal potential levels indicative of the engine operating parameters and/or of the ambient engine operating conditions that they are designed to sense. As many of the mechanical adjustments that should be made in response to changes of these sensed conditions may be effected through the operation of a solenoid armature, a solenoid armature positioning control system responsive to input analog signal representations of desired armature position for effecting the adjustment of the solenoid armature into the desired position is of value.

It is, therefore, an object of this invention to provide an improved solenoid armature positioning control system.

It is another object of this invention to provide an improved solenoid armature positioning control system that is effective to adjust the armature of a solenoid into a desired position as indicated by an input analog signal representation of the desired position.

It is another object of this invention to provide an improved armature positioning control system that is responsive to the summation of corresponding proportional and integral error signals indicative of the difference between desired solenoid armature position and the actual position for effecting the adjustment of the solenoid armature into the desired position.

In accordance with this invention, a proportional and integral solenoid armature positioning control system is provided wherein, when the actual position of the solenoid armature does not correspond to a desired position as indicated by an input electrical signal representation of desired solenoid armature position, respective first and second mutually exclusive proportional and integral error signals indicative respectively of the difference and the time history of the difference are summed and circuitry responsive to this summation effects the adjustment of the solenoid armature into the desired position.

Figure 2:
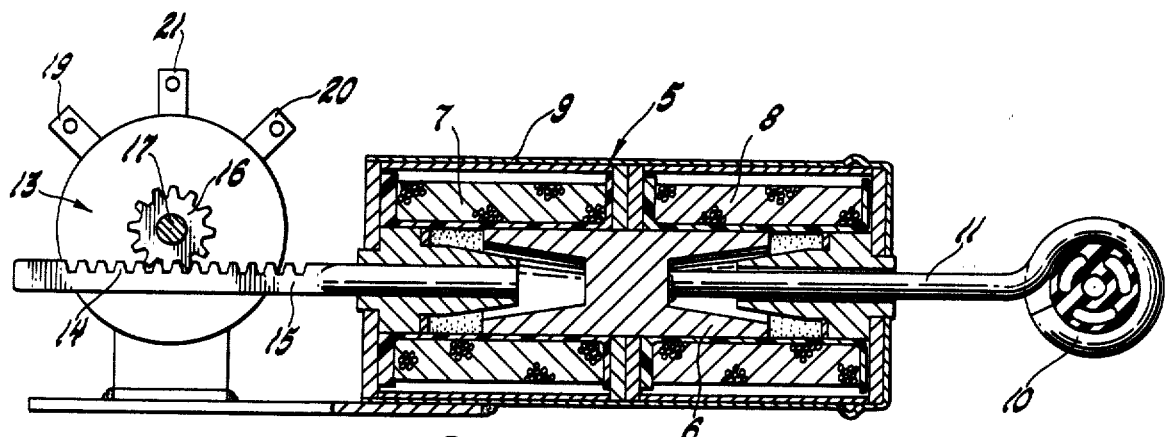
Figure 3A:
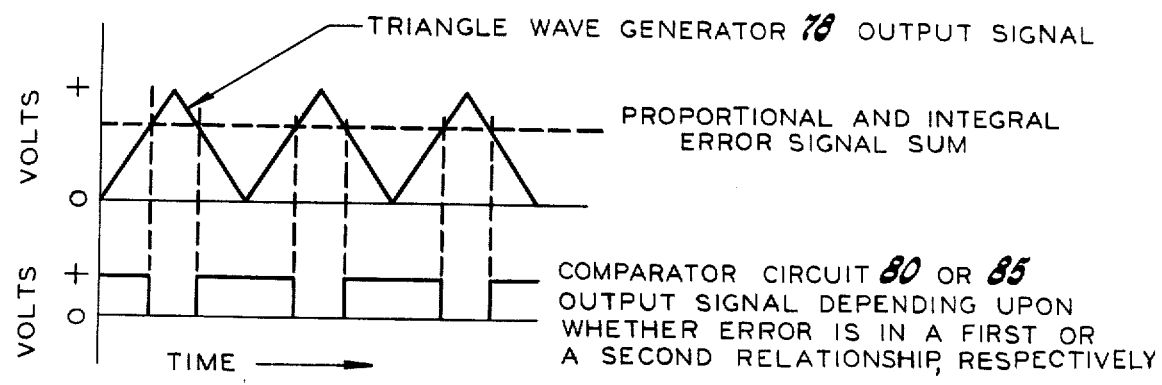
Figure 3B:
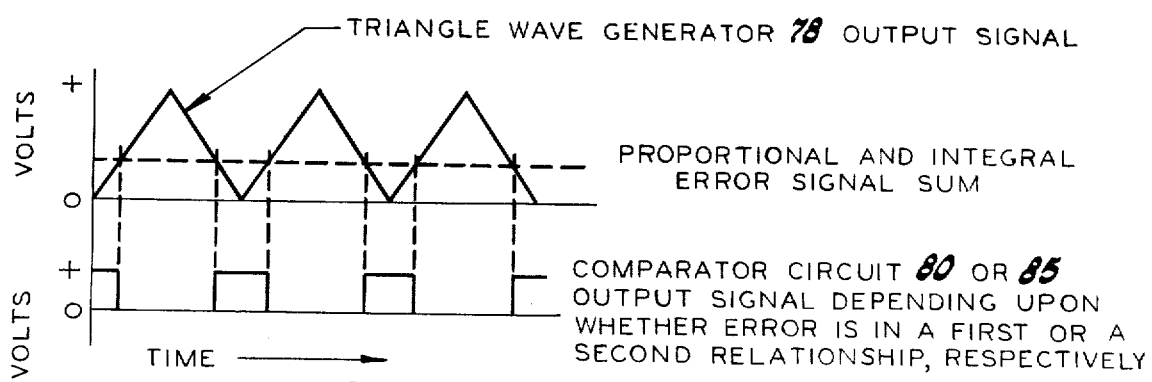

For a better understanding of the present invention, together with additional objects, advantages and features thereof, reference is made to the following description and accompanying drawing in which:

FIG. 1 sets forth the proportional and integral solenoid armature positioning control system of this invention in schematic form;

FIG. 2 illustrates in section a solenoid suitable for use with the system of this invention and one method of mounting a conventional potentiometer in a manner to be operated by the solenoid armature for producing an electrical reference signal that is a function of the actual solenoid armature position; and FIGS. 3a and 3b are two sets of curves useful in understanding the circuitry of FIG. 1.

As point of reference or ground potential is the same point electrically throughout the system, it is represented in FIG. 1 of the drawing by the accepted schematic symbol and referenced by the numeral 2.

The proportional and integral solenoid armature positioning control system of this invention employs four operational amplifier circuits of the Norton type, four conventional operational amplifier circuits and two conventional voltage comparator circuits. As these circuit elements may be commercially available items well known in the art and, per se, form no part of this invention, each has been illustrated in block form in the drawing. Furthermore, these devices are only examples of circuit elements suitable for use with the system of this invention. Consequently, there is no intention or inference of a limitation thereto as other circuit elements having similar electrical characteristics may be substituted therefor without departing from the spirit of the invention. The operational amplifier circuits of the Norton type, the conventional operational amplifier circuits and the conventional voltage comparator circuits may be of the type marketed by National Semiconductor Corporation under the designations LM3900, LM2902 and LM2901, respectively.

In accordance with logic terminology well known in the art, throughout this specification logic signals will be referred to as "High" or logic 1 and "Low" or logic 0 signals. For purposes of this specification, and without intention or inference of a limitation thereto, the "High" or logic 1 signals will be considered to be of a positive polarity potential and the "Low" or logic 0 signals will be considered to be of zero or ground potential.

A double-ended power supply may be employed as the supply potential source for the operational amplifier circuits. As power supplies of this type are well known in the art and, per se, form no part of this invention, in the interest of reducing drawing complexity, the positive and negative output terminals of a conventional double-ended power supply are indicated by a plus sign (+) within a circle and a minus sign (−) within a circle, respectively. A conventional storage battery 3 may supply the operating potential for the voltage comparator circuits.

The proportional and integral solenoid armature positioning control system of this invention effects the adjustment of the armature of a solenoid into the solenoid armature position corresponding to each different input electrical signal representation of desired solenoid aramture position.

As best illustrated in FIG. 2, one example of a solenoid suitable for use with the system of this invention is a dual operating coil double acting solenoid 5. Solenoid 5 has a movable armature 6, a first operating coil 7 that, when energized, effects the movement of armature 6 in a first direction and a second operating coil 8 that, when energized, effects the movement of armature 6 in a second opposite direction all enclosed in an electrically conductive case 9. The energizing potential for operating coils 7 and 8 may be supplied by battery 3 as illustrated in FIG. 1. In an actual embodiment, the terminal ends of coils 7 and 8 are connected to point of reference or ground potential 2 through conductive case 9. An external mechanically operable device may be operatively attached to ring 10 operated by armature 6 through operating rod 11.

To produce an electrical reference signal that is a function of the actual position of solenoid armature 6, this element may be arranged to operate the movable contact 12, FIG. 1, of a conventional potentiometer 13 through a rack 14 operated by armature 6 through operating rod 15 and an engaging pinion gear 16 operatively secured to the rotatable axle 17 of potentiometer 13 that operates movable contact 12 in a manner well known in the art. Also as is well known in the art, internally of potentiometer 13 is a resistor element 18, schematically illustrated in FIG. 1, connected across input terminals 19 and 20 and movable contact 12 is connected to terminal 21. Therefore, terminal 19 may be connected to point of reference or ground potential 2, terminal 20 may be connected to the positive polarity output terminal of battery 3 and terminal 21 may be connected to junction 22 of FIG. 1 through lead 23. In the interest of reducing drawing complexity, the positive polarity output terminal of battery 3 is represented in FIG. 1 as a plus sign (+) within a circle. Upon the adjustment of solenoid armature 6 to the right as viewing FIG. 2, pinion gear 16 and, hence, movable contact 12 are rotated in a counterclockwise direction and with the adjustment of solenoid armature 6 to the left as viewing FIG. 2, pinion gear 16 and, hence, movable contact 12 are rotated in a clockwise direction. As has been previously brought out, resistor element 18 of potentiometer 13 may be connected across point of reference or ground potential 2 and the positive polarity output terminal of battery 3 through respective input terminals 19 and 20. Consequently, an electrical reference signal that is a function of the actual position of solenoid armature 6 and, therefore, is indicative of the actual position of solenoid armature 6, appears across the movable contact 12 of potentiometer 13 and point of reference or ground potential 2. The potential magnitude of this electrical reference signal is equal to the potential drop across that portion of resistor element 18 between movable contact 12 and point of reference or ground potential 2.

The electrical reference signal that appears across movable contact 12 of potentiometer 13 and point of reference or ground potential 2 is applied as an input signal to the system of this invention through lead 23 to junctions 22, 31 and 32 of FIG. 1. A voltage divider network including series resistors 33 and 34 is connected across junction 31 and point of reference or ground potential 2 with the junction 36 therebetween being connected to the non-inverting input terminal of Norton type operational amplifier circuit 35. Junction 31 is connected through input resistor 37 to the inverting input terminal of Norton type operational amplifier circuit 30 and junction 32 is connected through input resistor 38 to the inverting input terminal of Norton type operational amplifier circuit 40 and through input resistor 39 to the non-inverting input terminal of Norton type operational amplifier circuit 45.

A source 25 of analog input electrical signal representations of desired solenoid armature position is connected to junctions 41, 42 and 43. As this source 25 of analog input electrical signal representations may be any convenient analog signal source and, per se, forms no part of this invention, it is illustrated in FIG. 1 in block form. Examples of sources of analog input electrical signal representations may be temperature transducers, pressure transducers, humidity transducers, vacuum transducers, digital to analog converters or any other device that produces an analog output signal that is a representation of a physical quantity. As an example of a typical application of the system of this invention, the source of analog input electrical signal representations may be a temperature transducer that produces an analog output signal representation of ambient temperature and the solenoid armature 6 of solenoid 5 may be arranged to mechanically operate the choke flapper valve of an internal combustion engine carburetor in such a manner as to adjust the choke flapper valve to the position dictated by ambient temperature. A voltage divider network including series resistors 46 and 47 is connected across junction 41 and point of reference or ground potential 2 with the junction 48 therebetween being connected to the non-inverting input terminal of Norton type operational amplifier circuit 30; junction 42 is connected through input resistor 49 to the inverting input terminal of Norton type operational amplifier circuit 35 and junction 43 is connected through input resistor 50 to the non-inverting input terminal of Norton type operational amplifier circuit 40 and through input resistor 51 to the inverting input terminal of Norton type operational amplifier circuit 45.

Each of Norton type operational amplifier circuits 30 and 35 having respective feedback resistors 55 and 56 connected between the cathode electrode of respective diodes 57 and 58 and the inverting input terminal thereof functions as an amplifier circuit. For the reason that with balanced currents into the non-inverting and inverting input terminals thereof, the Norton type operational amplifier circuit produces an output signal of the order of 100 millivolts, respective diodes 57 and 58 are connected between the output terminal of each and the feedback resistor to provide a direct current potential level shift in such a manner that an output signal of zero volts is obtained upon the cathode electrode of each of these diodes with balanced input currents.

Each of Norton type operational amplifier circuits 40 and 45 having respective integrating capacitors 60 and 61 and respective parallel diodes 62 and 63 connected across the output terminal and the inverting input terminal thereof functions as a difference integrator circuit in a manner to be later explained.

As is well known in the art, if the current flowing into the non-inverting input terminal of a Norton type operational amplifier circuit is of a magnitude greater than that of the current flowing into the inverting input terminal, the output voltage rises toward supply to feed current back into the inverting input terminal to equalize the current flowing into the non-inverting and inverting input terminals and if the current flowing into the inverting input terminal is of magnitude greater than that of the current flowing into the non-inverting input terminal, the output voltage falls in the direction to feed back less current. In the circuit of FIG. 1, the output voltage falls toward ground at the cathode of each of diodes 57 and 58. With a positive/negative supply, the actual Norton operational amplifier will fall to minus supply.

Should the source 25 of analog input electrical signal representations of desired solenoid armature position apply to the circuit of FIG. 1 an analog input signal representation of desired solenoid armature position of a positive polarity potential level greater than that of the reference signal produced by potentiometer circuit 13, both with respect to point of reference or ground potential 2, the desired solenoid armature 6 position does not correspond to the actual solenoid armature 6 position in a first relationship. As a consequence, an error signal appears across junctions 22 and 41 of a positive polarity upon junction 41 with respect to junction 22 and, therefore, the potential signal upon junctions 41, 42 and 43 is of a positive polarity with respect to that upon junctions 31 and 32 and of a difference magnitude proportional to the difference between the desired solenoid armature 6 position and the actual solenoid armature 6 position. As a result of this potential level difference between junctions 41, 42 and 43 and junctions 31 and 32, there is a greater magnitude of current flow into the non-inverting input terminal of each of Norton type operational amplifier circuits 30 and 40 that is flowing into the inverting input terminal of each of these circuits and there is a greater magnitude of current flow into the inverting input terminal of each of Norton type operational amplifier circuits 35 and 45 than is flowing into the non-inverting input terminal of each of these circuits. As the magnitude of current flow into the inverting input terminal of operational amplifier circuit 35 is greater than that flowing into the non-inverting input terminal thereof, the potential upon the cathode electrode of diode 58 falls toward ground potential. As the magnitude of current flow into the non-inverting input terminal of Norton type operational amplifier circuit 30 is greater than that flowing into the inverting input terminal thereof, the output potential of this operational amplifier circuit rises toward supply potential magnitude to the level that provides feedback current through feedback resistor 55 into the inverting input terminal thereof of a magnitude sufficient to equalize the magnitude of current flowing into both input terminals. As the output potential level of Norton type operational amplifier circuit 30 is directly proportional to the difference in magnitudes of current flowing into the input terminals thereof, this device functions as a difference amplifier circuit that is responsive to the input electrical signal representation of desired solenoid armature position and the reference signal for producing upon the cathode electrode of diode 57 an output direct current proportional error signal that is a function of the difference between the desired solenoid armature 6 position and the actual solenoid armature 6 position in a first relationship when the actual position of solenoid armature 6 does not correspond to the desired position in a first relationship as indicated by the input electrical signal representation of desired solenoid armature 6 position. As the magnitude of current flow into the inverting input terminal of Norton type operational amplifier circuit 45 is greater than that flowing into the non-inverting input terminal thereof, the output potential of this operational amplifier circuit falls toward ground potential and curent flows from the non-inverting input terminal toward the output terminal. This flow of current tends to charge capacitor 61 in such a direction that the plate thereof connected to the inverting input terminal of Norton type operational amplifier circuit 45 is of a positive polarity with respect to the other plate. However, when the charge upon capacitor 61 is substantially zero, this current is shunted around capacitor 61 by diode 63 which is connected in parallel with capacitor 61 and poled as indicated for the purpose of preventing capacitor 61 from charging in this direction. As the magnitude of current flow into the non-inverting input terminal of Norton type operational amplifier circuit 40 is greater than that flowing into the inverting input terminal thereof, the output potential of this operational amplifier circuit rises toward supply magnitude to feed current back into the inverting input terminal thereof through integrating capacitor 60. This flow of current charges integrating capacitor 60 in such a direction that the plate thereof connected to the output terminal of operational amplifier circuit 40 is of a positive polarity with respect to the other plate. The charge potential $V_{60}$ upon integrating capacitor 60, defined as positive at the operational amplifier circuit 40 output, is given by $V_{60} = 1/C_{60} \int i_{60} dt$. As the integral of dt is t, $V_{60} = i_{60}/C_{60}t$ for a constant $i_{60}$. (This implies a constant error voltage.) That is, the charge upon integrating capacitor 60 increases linearly with time for a fixed magnitude of error voltage and has a rate of rise to a higher potential level that is proportional to the difference in magnitudes of current flow into the input terminals of Norton type operational amplifier circuit 40. Norton type operational amplifier circuit 40 and integrating capacitor 60, therefore, function as a difference integrator circuit that is responsive to the input electrical signal representation of desired solenoid armature position and the reference signal for producing an output direct current integral error signal corresponding to the previously described proportional error signal produced by Norton type operational amplifier circuit 30 that increases linearly for a fixed error in a positive going sense with time. The output proportional error signal of Norton type operational amplifier circuit 30 and the corresponding output integral error output signal of Norton type operational amplifier circuit 40 are summed as a signal pair through respective input resistors 65 and 66 and applied to the inverting input terminal of operational amplifier circuit 70 having a feedback resistor 71 connected between the output and inverting input terminals thereof and the non-inverting input terminal thereof connected to point of reference or ground potential 2. With this arrangement, operational amplifier circuit 70 and the associated input and feedback resistors function as a summing amplifier circuit for summing the pair of corresponding proportional and integral error output signals of respective Norton type operational amplifier circuits 30 and 40. Because the proportional and integral error signals are of a positive polarity with respect to point of reference or ground potential 2 and are summed at the inverting input terminal of operational amplifier circuit 70, the output signal of operational amplifier circuit 70 is of a negative polarity with respect to point of reference or ground potential 2. The operational amplifier circuit 70 inverted output signal sum of the proportional and integral error signals is applied through input resistor 72 to the inverting input terminal of a conventional operational amplifier circuit 75 having a feedback resistor 73 connected between the output and inverting output terminals thereof and the non-inverting input terminal connected to point of reference or ground potential 2. This inverted output signal sum is re-inverted by operational amplifier circuit 75 and applied through input resistor 76 to the non-inverting input terminal of a conventional voltage comparator circuit 80 as a positive polarity signal of a potential level equal to the sum of the proportional and integral error signals.

The output signal of a triangle wave generator 78 is applied through respective input resistors 81 and 82 to the inverting input terminal of each of conventional voltage comparator circuits 80 and 85. As the output terminal of each of voltage comparator circuits 80 and 85 is the uncommitted collector electrode of an NPN transistor, respective resistors 83 and 84 are the conventional pull up resistors used with comparator circuits of this type. As triangle wave generator 78 may be any of the many triangle wave generators well known in the art and, per se, forms no part of this invention, it is illustrated in FIG. 1 in block form. Triangle wave generator 78 is designed to produce a series of equal triangular output waves of a positive polarity sense with respect to point of reference or ground potential 2 and of a frequency or repetition rate of the order of forty (40) waves per second. One example of a triangle wave generator suitable for use with this application is illustrated on page 3-204 of a publication of the National Semiconductor Corporation entitled, "Linear Data Book," that was copyrighted in 1976. When the potential level of the triangle waveform output signal of triangle wave generator 78 is less than that of the operational amplifier circuit 76 output signal sum of the proportional and integral error signals in a positive polarity sense, voltage comparator cicuit 80 produces a logic 1 output signal that is applied through resistor 86 to the base electrode of NPN trnsistor 90 in the proper polarity relationship to produce base-emitter drive current through an NPN transistor. This drive current switches NPN transistor 90 conductive through the collector-emitter electrodes thereof to complete a circuit through which emitter-base drive current is supplied to PNP transistor 91 which may be traced from the positive polarity output terminal of battery 3, through the emitter-base electrodes of PNP transistor 91, resistor 87, the collector-emitter electrodes of NPN transistor 90 and point of reference or ground potential 2 to the negative polarity output terminal of battery 3. This emitter-base drive current triggers PNP transistor 91 conductive through the emitter-collector thereof to complete an energizing circuit for operating coil 7 of solenoid 5 which may be traced from the positive polarity output terminal of battery 3, through the emitter-collector electrodes of PNP transistor 91, operating coil 7 and point of reference or ground potential 2 to the negative polarity output terminal of battery 3. Operating coil 7 is wound in such a manner that, upon energization, the resulting magnetic field effects the movement of solenoid armature 6 in the direction to increase the potential level of the reference signal, a condition that adjusts solenoid armature 6 into the desired solenoid armature position. Therefore, upon the energization of operating coil 7, solenoid armature 6 is moved in the direction to effect the adjustment thereof into the desired solenoid armature position. As solenoid armature 6 is moved in this direction, potentiometer 13 is adjusted in such a manner that the reference signal across movable contact 12 and point of reference or ground potential 2 increases in potential level in a positive-going sense toward that of the input electrical signal representation of desired solenoid armature position. As this potentiometer 12 adjustment is made, the proportional error signal upon the cathode electrode of diode 57 decreases in potential level and approaches zero or ground potential as solenoid armature 6 approaches the desired position. The increase in potential level magnitude of the integral error signal output of Norton type operational amplifier circuit 40, however, continues until solenoid armature 6 is adjusted into the desired position. When solenoid armature 6 has been adjusted into the desired position, the current flow into both input terminals of Norton type operational amplifier circuit 40 are equal. At this time, the integral error signal ceases increasing in potential level and remains at the potential level attained. Because of the friction and inertia of the mechanical system including solenoid 6 that is operated by solenoid armature 6, this integral error signal is of an insufficient potential level to effect any more adjustment of solenoid armature 6.

Should the source 25 of analog input electrical signal representations of desired solenoid armature position apply to the circuit of FIG. 1 an analog input signal representation of desired solenoid armature position of a positive polarity potential level less than that of the reference signal produced by potentiometer circuit 13, both with respect to point of reference or ground potential 2, the desired solenoid armature 6 position does not correspond to the actual solenoid armature 6 position in a second relationship. As a consequence, an error signal appears across junctions 22 and 41 of a positive polarity upon junction 22 with respect to junction 41 and, therefore, the potential signal upon junctions 22, 31 and 32 is of a positive polarity with respect to that upon junctions 41, 42 and 43 and of a difference magnitude proportional to the difference between the desired solenoid armature 6 position and the actual solenoid armature 6 position. As a result of this potential level difference between junctions 22, 31 and 32 and junctions 41, 42 and 43, there is a greater magnitude of current flow into the inverting input terminal of each of Norton type operational amplifier circuits 30 and 40 than is flowing into the non-inverting input terminal of each of these circuits and there is a greater magnitude of current flow into the non-inverting input terminal of each of Norton type operational amplifier circuits 35 and 45 than is flowing into the inverting input terminal of each of these circuits. As the magnitude of current flow into the inverting input terminal of operational amplifier circuit 30 is greater than that flowing into the non-inverting input terminal thereof, the potential upon the cathode electrode of diode 57 falls toward ground potential. As the magnitude of current flow into the non-inverting input terminal of Norton type operational amplifier circuit 35 is greater than that flowing into the inverting input terminal thereof, the output potential of this operational amplifier circuit rises toward supply potential magnitude of the level that provides feedback current through feedback resistor 56 into the inverting input terminal thereof of a magnitude sufficient to equalize the magnitude of current flowing into both input terminals. As the output potential level of Norton type operational amplifier circuit 35 is directly proportional to the difference in magnitudes of current flowing into the input terminals thereof, this device functions as a difference amplifier circuit that is responsive to the input electrical signal representation of desired solenoid armature position and the reference signal for producing upon the cathode electrode of diode 58 and output direct current proportional error signal that is a function of the difference between the desired solenoid armature 6 position and the actual solenoid armature 6 position in a second relationship when the actual position of solenoid armature 6 does not correspond to the desired position in a second relationship as indicated by the input electrical signal representation of desired solenoid armature 6 position. As the magnitude of current flow into the inverting input terminal of Norton type operational amplifier circuit 40 is greater than that flowing into the non-inverting input terminal thereof, the output potential of this operational amplifier circuit falls toward ground potential and current flows from the non-inverting input terminal toward the output terminal. This flow of current tends to charge capacitor 60 in such a direction that the plate thereof connected to the inverting input terminal of Norton type operational amplifier circuit 40 is of a positive polarity with respect to the other plate. However, when the charge upon capacitor 60 is substantially zero, this current is shunted around capacitor 60 by diode 62 which is connected in parallel with capacitor 60 and poled as indicated for the purpose of preventing capacitor 60 from charging in this direction. As the magnitude of current flow into the non-inverting input terminal of Norton type operational amplifier circuit 45 is greater than that flowing into the inverting input terminal thereof, the output potential of this operational amplifier circuit rises toward supply magnitude to feed current back into the inverting input terminal thereof through integrating capacitor 61. This flow of current charges integrating capacitor 61 in such a direction that the plate thereof connected to the output terminal of operational amplifier circuit 45 is of a positive polarity with respect to the other plate. For reasons hereinafter set forth in detail, the charge upon integrating capacitor 61 increases linearly with time for a fixed magnitude of error voltage and has a rate of rise to a higher potential level that is proportional to the difference in magnitudes of current flow into the input terminals of Norton type operational amplifier circuit 45. Norton type operational amplifier circuit 45 and integrating capacitor 61, therefore, function as a difference integrator circuit that is responsive to the input electrical signal representation of desired solenoid armature position and the reference signal for producing an output direct current integral error signal corresponding to the previously described proportional error signal produced by Norton type operational amplifier circuit 35 that increases linearly for a fixed error in a positive going sense with time. The output proportional error signal of Norton type operational amplifier circuit 35 and the corresponding output integral error output signal of Norton type operational amplifier circuit 45 are summed as a signal pair through respective input resistors 92 and 93 and applied to the inverting input terminal of operational amplifier circuit 95 having a feedback resistor 94 connected between the output and inverting input terminals thereof and the non-inverting input terminal thereof connected to point of reference or ground potential 2. With this arrangement, operational amplifier circuit 95 and the associated input and feedback resistors function as a summing amplifier circuit for summing the pair of corresponding proportional and integral error output signals of respective Norton type operational amplifier circuits 35 and 45. Because the proportional and integral error signals are of a positive polarity with respect to point of reference or ground potential 2 and are summed at the inverting input terminal of operational amplifier circuit 95, the output signal of operational amplifier circuit 95 is of a negative polarity with respect to point of reference or ground potential 2. The operational amplifier circuit 95 inverted output signal sum of the proportional and integral error signals is applied through input resistor 96 to the inverting input terminal of a conventional operational amplifier circuit 100 having a feedback resistor 101 connected between the output and inverting output terminals thereof and the non-inverting input terminal connected to point of reference or ground potential 2. This inverted output signal sum is re-inverted by operational amplifier circuit 100 and applied through input resistor 102 to the non-inverting input terminal of a conventional voltage comparator circuit 85 as a positive polarity signal of a potential level equal to the sum of the proportional and integral error signals.

When the potential level of the triangle waveform output signal of triangle wave generator 78 is less than that of the operational amplifier circuit 100 output signal sum of the proportional and integral error signals in a positive polarity sense, voltage comparator circuit 85 produces a logic 1 output signal that is applied through resistor 103 to the base electrode of NPN transistor 105 in the proper polarity relationship to produce base-emitter drive current through an NPN transistor. This drive current switches NPN transistor 105 conductive through the collector-emitter electrodes thereof to complete a circuit through which emitter-base drive current is supplied to PNP transistor 110 which may be traced from the positive polarity output terminal of battery 3, through the emitter-base electrodes of PNP transistor 110, resistor 112, the collector-emitter electrodes of NPN transistor 105 and point of reference or ground potential 2 to the negative polarity output terminal of battery 3. This emitter-base drive current triggers PNP transistor 110 conductive through the emitter-collector electrodes thereof to complete an energizing circuit for operating coil 8 of solenoid 5 which may be traced from the positive polarity output terminal of battey 3, through the emitter-collector electrodes of PNP transistor 110, operating coil 8 and point of reference or ground potential 2 to the negative polarity output terminal of battery 3. Operating coil 8 is wound in such a manner that, upon energization, the resulting magnetic field effects the movement of solenoid armature 6 in the direction to decrease the potential level of the reference signal, a condition that adjusts solenoid armature 6 into the desired solenoid armature position. Therefore, upon the energization of operating coil 8, solenoid armature 6 is moved in the direction to effect the adjustment thereof into the desired solenoid armature position. As solenoid armature 6 is moved in this direction, potentiometer 13 is adjusted in such a manner that the reference signal across movable contact 12 and point of reference or ground potential 2 decreases in potential level in a negative-going sense toward that of the input electrical signal representation of desired solenoid armature position. As this potentiometer 13 adjustment is made, the proportional error signal upon the cathode electrode of diode 58 decreases in potential level and approaches zero or ground potential as solenoid armature 6 approaches the desired position. The increase in potential level magnitude of the integral error signal output of Norton type operational amplifier circuit 45, however, continues until solenoid armature 6 is adjusted into the desired position. When solenoid armature 6 has been adjusted into the desired position, the current flow into both input terminals of Norton type operational amplifier circuit 45 are equal. At this time, the integral error signal ceases increasing in potential level and remains at the potential level attained. Because of the friction and inertia of the mechanical system including solenoid 5 that is operated by solenoid armature 6, this integral error signal is of an insufficient potential level to effect any more adjustment of solenoid armature 6.

From this description, it is apparent that Norton type operational amplifier circuits 30 and 40 produce respective mutually exclusive proportional error signals that are a function of the difference between the desired and actual solenoid armature positions in respective first and second relationships; that the difference integrator circuits comprising Norton type operational amplifier circuit 40 and integrating capacitor 60 and Norton type operational amplifier circuit 45 and integrating capacitor 61 produce respective mutually exclusive integral error signals; that the integral error signals produced by the Norton type operational amplifier circuit 40-integrating capacitor 60 difference integrator circuit corresponds to the proportional error signals produced by Norton type operational amplifier circuit 30 and that the integral error signals produced by the Norton type operational amplifier circuit 45-integrating capacitor 61 difference integrator circuit corresponds to the proportional error signals produced by Norton type operational amplifier circuit 35.

FIG. 3 sets forth two sets of curves useful in understanding the system of this invention. The width of each output signal of either comparator circuit 80 or 85, depending upon whether the error between the desired and actual solenoid armature 6 positions is in a respective first or second relationship, is equal to the period of time that the output signal of the triangle wave generator 78 is of a potential level less than that of the proportional and integral error signal sum. Therefore, the width of this output signal decreases as the sum of the proportional and integral error signals decreases, as is shown by comparing FIGS. 3A and 3B. As a consequence, the duty cycle of the energization of the solenoid 5 operating coils is directly proportional to the sum of the proportional and integral error signals associated with the desired and actual solenoid armature 6 positions.

While a preferred embodiment of the present invention has been shown and described, it will be obvious to those skilled in the art that various modifications and substitutions may be made without departing from the spirit of the invention which is to be limited only within the scope of the appended claims.

The embodiments of the invention in which an exclusive property or privilege is claimed are defined as follows:

1. A proportional and integral solenoid armature positioning control system for effecting the adjustment of the armature of a solenoid into the solenoid armature position corresponding to each different input electrical signal representation of desired solenoid armature position comprising:

means for producing an electrical reference signal that is a function of the actual position of said solenoid armature;

first and second circuit means responsive to an input electrical signal representation of desired solenoid armature position and said reference signal for producing respective first and second mutually exclusive proportional error signals that are a function of the difference between the desired and actual solenoid armature positions in respective first and second relationships when the actual position of said solenoid armature does not correspond to the desired position as indicated by the input electrical signal representation of desired solenoid armature position;

third and fourth circuit means responsive to the said input electrical signal representation of desired solenoid armature position and said reference signal for producing respective first and second mutually exclusive integral error signals each of which corresponds to a respective one of said first and second proportional error signals;

means for summing each pair of corresponding said proportional and integral error signals; and means responsive to the sum of said corresponding said proportional and integral error signals for effecting the adjustment of said solenoid armature into said desired solenoid armature position.

2. A proportional and integral solenoid armature positioning control system for effecting the adjustment of the armature of a solenoid into the solenoid armature position corresponding to each different input electrical signal representation of desired solenoid armature position comprising:

means for producing an electrical reference signal that is a function of the actual position of said solenoid armature;

first and second circuit means responsive to an input electrical signal representation of desired solenoid armature position and said reference signal for producing respective first and second mutually exclusive proportional error signals that are a function of the difference between the desired and actual solenoid armature positions in respective first and second relationships when the actual position of said solenoid armature does not correspond to the desired position as indicated by the input electrical signal representation of desired solenoid armature position;

third and fourth circuit means responsive to the said input electrical signal representation of desired solenoid armature position and said reference signal for producing respective first and second mutually exclusive integral error signals each of which corresponds to a respective one of said first and second proportional error signals;

means for summing each pair of corresponding said proportional and integral error signals;

means for producing an electrical saw tooth waveform;

first means responsive to said saw tooth waveform and to the sum of one said pair of corresponding said proportional and integral error signals for effecting the adjustment of said solenoid armature in a first direction into said desired armature position; and second means responsive to said saw tooth waveform and to the sum of the other said pair of corresponding said proportional and integral error signals for effecting the adjustment of said solenoid armature in a second direction into said desired armature position.

3. A proportional and integral solenoid armature positioning control system for effecting the adjustment of the armature of a solenoid into the solenoid armature position corresponding to each different input electrical signal representation of desired armature position comprising:

means for producing an electrical reference signal that is a function of the actual position of said solenoid armature;

first and second circuit means responsive to an input electrical signal representation of desired solenoid armature position and said reference signal for producing respective first and second mutually exclusive proportional error signals that are a function of the difference between the desired and actual solenoid armature positions in respective first and second relationships when the actual position of said solenoid armature does not correspond to the desired position as indicated by the input electrical signal representation of desired solenoid armature position;

third and fourth circuit means responsive to the said input electrical signal representation of desired solenoid armature position and said reference signal for producing respective first and second mutually exclusive integral error signals each of which corresponds to a respective one of said first and second proportional error signals;

means for summing each pair of corresponding said proportional and integral error signals;

means for producing an electrical saw tooth waveform;

first means responsive to said saw tooth waveform and to the sum of one said pair of corresponding said proportional and integral error signals for producing a first output electrical signal when the potential level of the sum of said one pair of corresponding said proportional and integral error signals is greater than that of said saw tooth waveform;

second means responsive to said saw tooth waveform and to the sum of the other said pair of corresponding said proportional and integral error signals for producing a second output electrical signal when the potential level of the sum of said other pair of corresponding said proportional and integral error signals is greater than that of said saw tooth waveform; and means responsive to said first and second output signals for effecting the adjustment of said solenoid armature in respective first and second opposite directions into said desired armature position.

* * * * *